United States Patent
Nakashima (10) Patent No.: US 10,339,587 B2
(45) Date of Patent: Jul. 2, 2019

(54) METHOD, MEDIUM, AND SYSTEM FOR CREATING A PRODUCT BY APPLYING IMAGES TO MATERIALS

(71) Applicant: FUJIFILM CORPORATION, Tokyo (JP)

(72) Inventor: Teruyoshi Nakashima, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 550 days.

(21) Appl. No.: 15/210,358

(22) Filed: Jul. 14, 2016

(65) Prior Publication Data
US 2017/0032443 A1 Feb. 2, 2017

(30) Foreign Application Priority Data

Jul. 31, 2015 (JP) ................................ 2015-152796

(51) Int. Cl.
*G06Q 30/00* (2012.01)
*G06Q 30/06* (2012.01)
(Continued)

(52) U.S. Cl.
CPC ........... *G06Q 30/0631* (2013.01); *G06F 3/14* (2013.01); *G06K 9/00221* (2013.01);
(Continued)

(58) Field of Classification Search
CPC .......... G06Q 30/0631; G06Q 30/0282; G06Q 30/0621; G06F 3/14; G06K 9/00221;
(Continued)

(56) References Cited

U.S. PATENT DOCUMENTS 7,216,092 B1 * 5/2007 Weber .................. G06Q 10/087
358/1.13
7,885,861 B2 * 2/2011 Mills ...................... G06Q 30/02
705/27.2

(Continued)

FOREIGN PATENT DOCUMENTS

EP 2779099 A2 9/2014
JP 2007-080164 A 3/2007
(Continued)

OTHER PUBLICATIONS https://web.archive.org/web/20130117212919/http://www.shapecollage.com/help (Year: 2013).*
(Continued)

*Primary Examiner* — Matthew E Zimmerman
(74) *Attorney, Agent, or Firm* — Studebaker & Brackett PC (57) ABSTRACT

In the image processing apparatus, the image processing method, the program and the recording medium, the first product material selector selects the first product material from among the plurality of product materials in accordance with the instruction of the user. The second product material selector selects the second product material that is different from the first product material from among the plurality of product materials. The product creator creates the recommended product by applying the first image constituting at least part of the group of images to the second product material. When second images constituting at least part of the group of images are displayed on the display of the terminal device of the user in accordance with the instruction of the user, the display controller causes the recommended product to be displayed, together with the second images, on the display at least once.

19 Claims, 5 Drawing Sheets

(51) Int. Cl.
*G06Q 30/02* (2012.01)
*G06F 3/14* (2006.01)
*G06K 9/00* (2006.01)
*G06T 7/00* (2017.01)

(52) U.S. Cl.
CPC ..... *G06K 9/00677* (2013.01); *G06Q 30/0282* (2013.01); *G06Q 30/0621* (2013.01); *G06T 7/00* (2013.01); *G06K 2009/00738* (2013.01); *G06T 2207/10024* (2013.01)

(58) Field of Classification Search
CPC ...... G06K 9/00677; G06K 2009/00738; G06T 7/00; G06T 2207/10024
See application file for complete search history.

(56) References Cited

U.S. PATENT DOCUMENTS

| | | | | |
|---|---|---|---|---|
| 2002/0010625 A1* | 1/2002 | Smith | .................. | G06Q 30/02 705/14.52 |
| 2003/0065590 A1* | 4/2003 | Haeberli | ............ | G06Q 30/0621 705/26.5 |
| 2005/0111737 A1* | 5/2005 | Das | .................. | G06F 16/54 382/190 |
| 2006/0155612 A1* | 7/2006 | Haeberli | ............ | G06Q 30/0621 705/26.5 |
| 2006/0184432 A1* | 8/2006 | Hanechak | ............ | G06Q 30/02 705/26.5 |
| 2007/0156433 A1* | 7/2007 | Thorson | ............... | G06Q 30/06 705/26.1 |
| 2008/0022327 A1* | 1/2008 | Murray | ............. | H04N 1/00132 725/82 |
| 2009/0263038 A1* | 10/2009 | Luo | ..................... | G06K 9/32 382/254 |
| 2011/0205595 A1 | 8/2011 | Yamamoto | | |
| 2013/0064476 A1* | 3/2013 | Cohen | ................. | G06F 16/5866 382/305 |
| 2014/0095587 A1* | 4/2014 | Schult | ................... | G06F 3/1242 709/203 |
| 2014/0281965 A1* | 9/2014 | Yamaji | ................ | G06F 3/04817 715/708 |
| 2015/0086116 A1 | 3/2015 | Yamaji | | |
| 2015/0339731 A1* | 11/2015 | Bloem | .............. | G06Q 30/0276 705/14.72 |
| 2015/0339754 A1* | 11/2015 | Bloem | .............. | G06Q 30/0631 705/26.7 |
| 2016/0041957 A1* | 2/2016 | Finsterwald | ......... | G06F 3/0484 715/202 |
| 2017/0032443 A1* | 2/2017 | Nakashima | ........ | G06Q 30/0282 |

FOREIGN PATENT DOCUMENTS

| | | |
|---|---|---|
| JP | 2007-323523 A | 12/2007 |
| JP | 5587398 B2 | 9/2014 |
| JP | 2015-089112 A | 5/2015 |

OTHER PUBLICATIONS

An Office Action mailed by the Japanese Patent Office dated Aug. 28, 2018, which corresponds to Japanese Patent Application No. 2015-152796 and is related to U.S. Appl. No. 15/210,358.

The extended European search report issued by the European Patent Office dated Aug. 22, 2016, which corresponds to European Patent Application No. 16179475.5-1958 and is related to U.S. Appl. No. 15/210,358.

Communication pursuant to Article 94(3) EPC issued by the European Patent Office dated Jan. 26, 2018, which corresponds to European Patent Application No. 16 179 475.5-1222 and is related to U.S. Appl. No. 15/210,358.

* cited by examiner

METHOD, MEDIUM, AND SYSTEM FOR CREATING A PRODUCT BY APPLYING IMAGES TO MATERIALS

CROSS-REFERENCE TO RELATED APPLICATIONS

The present application claims priority under 35 U.S.C. § 119 to Japanese Patent Application No. 2015-152796, filed on Jul. 31, 2015. The above application is hereby expressly incorporated by reference, in its entirety, into the present application.

BACKGROUND OF THE INVENTION

The present invention relates to an image processing apparatus, an image processing method and a recording medium for recommending users products which are created by applying images owned by users to product materials.

In connection with systems allowing users to order photo-related products, such as normal prints and photo books, from users' terminal devices via networks, there is a well-known technique to show a product other than a product a user has ordered, when an image of a list of products in a shopping cart and subsequent images are displayed, before an image indicative of the completion of order procedure appears, thereby recommending another product to the user.

In the above technique, however, another product is recommended after the user has completed his/her operation for shopping, and with that timing, the user is unlikely to be motivated to buy the recommended product. Besides, in the case where a composite image is ordered such as a photo book, it is easy to recommend a composite image created with images which are not ones owned by a user; however, this does not motivate the user to order a recommended composite image because it is hard for the user to picture a composite image created with the user's images.

Prior art references related to the present invention include JP 2007-80164 A, JP 2007-323523 A and JP 5587398 B.

JP 2007-80164 A describes an order receiving apparatus that counts the number of images having been recorded on a recording medium for the purpose of ordering prints, determines a printing service to recommend to a user depending on the number of images, and displays, on a display, a recommending screen provided to recommend a determined printing service to the user.

JP 2007-323523 A describes a campaign notifying system that compares ordered product materials specified by a user and the order amounts thereof with campaign information including information on target product materials of a campaign, requirements for receiving benefits, and contents of those benefits, which are set in advance by a vendor, and that when any of the ordered product materials is a target product material of the campaign, notifies the user of benefit application information about the requirements for receiving benefits and information on the benefit contents in relation to the target product material of the campaign.

JP 5587398 B describes a system for creating a medium having images laid out thereon, the system storing therein an operation history related to the operation for laying out images in a layout frame of a first medium, determining at least one of images associated with the operation history as a recommended image, determining a second medium to recommend as a layout target on which the recommended image is to be laid out, and presenting the recommended image and the second medium to a user.

SUMMARY OF THE INVENTION

None of JP 2007-80164 A, JP 2007-323523 A and JP 5587398 B mentions, however, as to when to make recommendation of products to users to promote sales of products.

An object of the invention is to overcome drawbacks of the related art and provide an image processing apparatus, an image processing method and a recording medium capable of recommending products to users in a timely manner, thereby promoting sales of products.

In order to attain the object described above, the present invention provides an image processing apparatus including:

a product material storage configured to store a plurality of product materials therein;

an instruction acquiring section configured to acquire an instruction input by a user;

a group-of-image acquiring section configured to acquire a group of images in accordance with an instruction of the user;

a first product material selector configured to select a first product material from among the plurality of product materials in accordance with an instruction of the user;

a second product material selector configured to select a second product material that is different from the first product material from among the plurality of product materials;

a product creator configured to create a recommended product by applying a first image constituting at least part of the group of images to the second product material; and a display controller configured to, when second images constituting at least part of the group of images are displayed on a display of a terminal device of the user in accordance with an instruction of the user, cause the recommended product to be displayed, together with the second images, on the display at least once.

Also, the present invention provides an image processing method including:

a step of acquiring an instruction input by a user, with an instruction acquiring section;

a step of acquiring a group of images in accordance with an instruction of the user, with a group-of-image acquiring section;

a step of selecting a first product material from among a plurality of product materials in accordance with an instruction of the user, with a first product material selector;

a step of selecting a second product material that is different from the first product material from among the plurality of product materials, with a second product material selector;

a step of creating a recommended product by applying a first image constituting at least part of the group of images to the second product material, with a product creator; and a step of, when second images constituting at least part of the group of images are displayed on a display of a terminal device of the user in accordance with an instruction of the user, causing the recommended product to be displayed, together with the second images, on the display at least once, with a display controller.

Also, the present invention provides a non-transitory computer readable recording medium having recorded thereon a program for causing a computer to execute each step of the image processing method described above.

According to the invention, a recommended product is displayed on a display together with second images before a user finishes to order a product. This configuration can increase the length of time that the user sees the recommended product together with the second images, and therefore, it is possible to effectively recommend the recommended product to the user, thereby promoting sales of the recommended product.

DETAILED DESCRIPTION OF THE INVENTION

An image processing apparatus, an image processing method and a recording medium of the present invention are described below in detail with reference to a preferred embodiment shown in the accompanying drawings.

Figure 1:
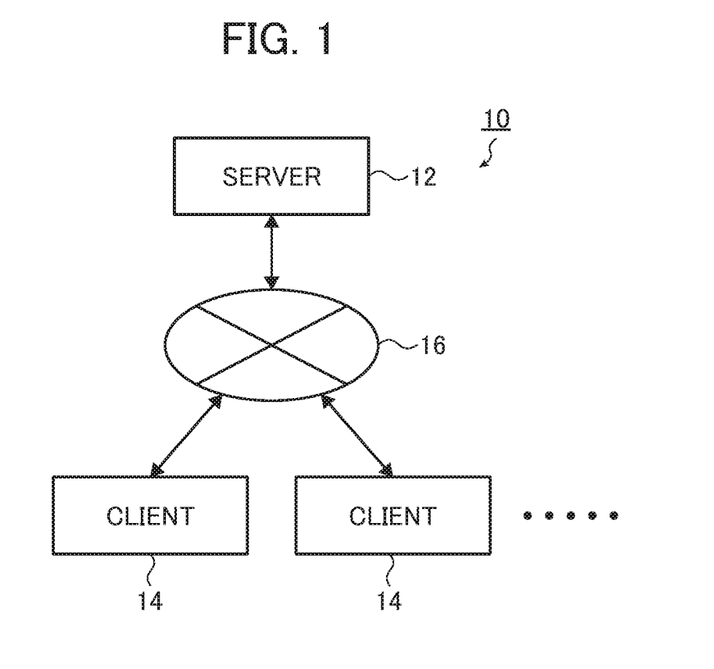
FIG. 1 is a block diagram showing an example of the configuration of an image processing apparatus according to the invention.

FIG. 1 is a block diagram showing an embodiment of the configuration of an image processing apparatus according to the invention. An image processing apparatus 10 shown in FIG. 1 recommends users recommended products created by applying images owned by users to product materials. The image processing apparatus 10 includes a server 12 and one or more clients 14 connected to the server 12 via a network 16 such as the Internet.

Figure 2:
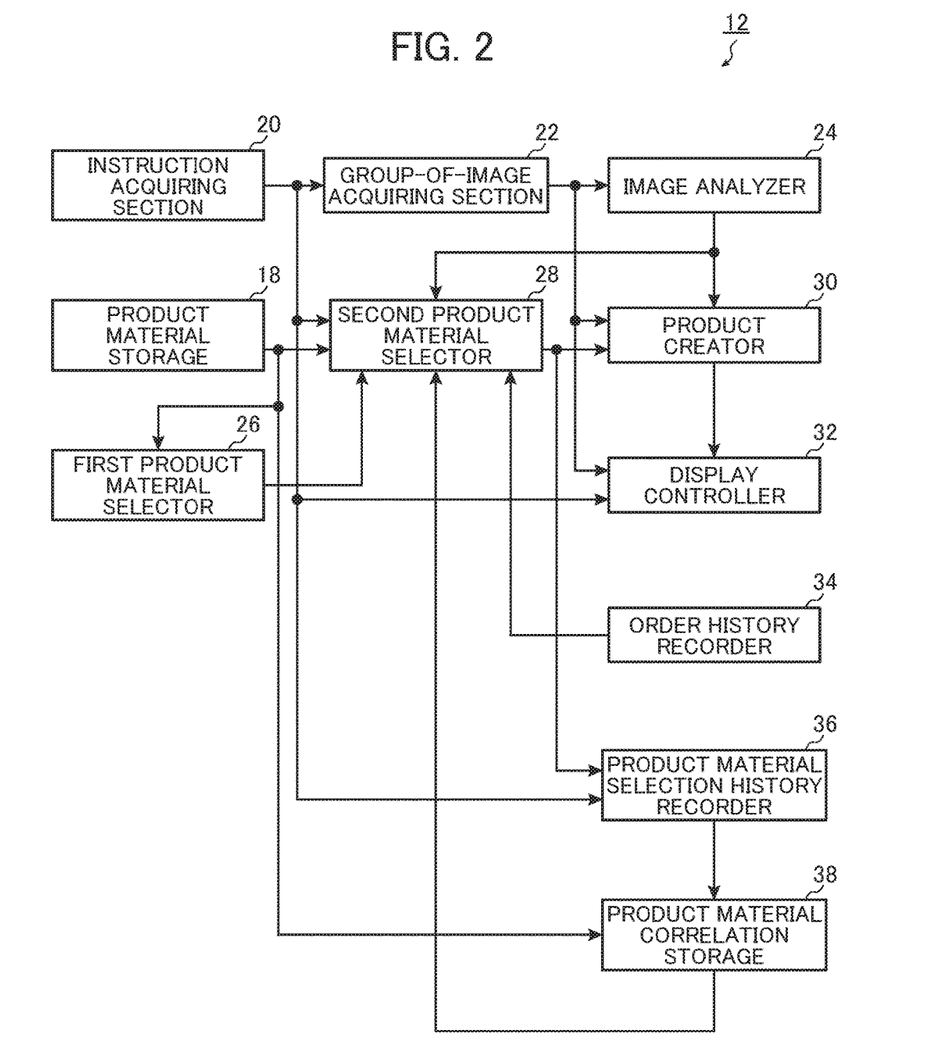
FIG. 2 is a block diagram showing an example of the configuration of a server shown in FIG. 1.

FIG. 2 is a block diagram showing an embodiment of the configuration of the server shown in FIG. 1. As shown in FIG. 2, the server 12 includes a product material storage 18, an instruction acquiring section 20, an group-of-image acquiring section 22, an image analyzer 24, a first product material selector 26, a second product material selector 28, a product creator 30, a display controller 32, an order history recorder 34, a product material selection history recorder 36 and a product material correlation storage 38.

In the server 12, the product material storage 18 stores a plurality of product materials therein.

The term "product material" herein refers to the type of product (photo-related product) ordered by users. A product is created by applying images owned by a user to a product material. Product materials include physical objects and electronic data.

Examples of physical objects include single prints (e.g., a normal print, a postcard print, an index sheet, a photo collage, a print with a frame, and an enlarged print), collective prints each containing plural images (e.g., a collection of single prints, a calendar having images, and a shuffle print), photo albums (e.g., a photo book), prints associated with electronic data, recording media that store thereon images or electronic data including images, such as a compact disc-recordable (CD-R), a digital versatile disc recordable (DVD-R), a universal serial bus (USB) memory and a secure digital (SD) card, and clothes and commodities having printed images thereon.

Examples of electronic data include data of a group of images, data of a photo album including images, slide shows, slide shows with sound, and moving images having processed images or sounds.

The instruction acquiring section 20 acquires instructions users have input from users' clients (terminal devices) 14.

The instruction acquiring section 20 acquires, via the network 16, various instructions users have input from users' clients 14. Such instructions include, for instance, an instruction to transmit or upload a group of images from a user's client 14 to the server 12, an instruction to display, of a group of images, an image on the display of a user's client 14, an instruction to select a product material, and an instruction to select, from among a group of images, an image to be applied to a selected product material.

The group-of-image acquiring section 22 acquires a group of images which are owned by a user and to be applied to a product material, in accordance with an instruction acquired by the instruction acquiring section 20.

The image analyzer 24 analyzes each image included in a group of images acquired by the group-of-image acquiring section 22.

The image analyzer 24 carries out various image analyses that include, for instance, calculation of the number of images included in a group of images; acquisition of information on images such as capturing times and capturing locations of images; individual and comparative evaluations on the brightness, color, out-of-focus blur, motion blur and resolution of images; calculation of evaluation values of images; face detection processing for detecting face regions in images; face recognition processing for recognizing faces of persons present in images; main person analysis processing for analyzing main persons and important persons among persons present in a group of images; priority person analysis processing for analyzing a specific person who should be prioritized among persons present in a group of images; important object analysis processing for analyzing important objects other than a person; event detection processing for detecting events for which images have been captured; and similar image determination processing for determining similar images included in a group of images to acquire a group of similar images.

The first product material selector 26 selects a first product material used for creating a user-selected product, which will be described later, from among a plurality of product materials stored in the product material storage 18 in accordance with a user's instruction acquired by the instruction acquiring section 20.

The second product material selector 28 selects a second product material that is different from the first product material and is used for creating a recommended product, which will be described later, from among a plurality of product materials stored in the product material storage 18.

The product creator 30 creates a user-selected product (i.e., an image thereof) by applying at least one image (third image) of a group of images acquired by the group-of-image acquiring section 22 to a first product material selected by the first product material selector 26. The product creator 30 also creates a recommended product (i.e., an image thereof) by applying at least one image (first image) of a group of images acquired by the group-of-image acquiring section 22 to a second product material selected by the second product material selector 28.

When at least partial images (second images) of a group of images are displayed on the display of a user's client 14 in accordance with a user's instruction, the display controller 32 causes a recommended product (i.e., an image thereof)

created by the product creator 30 to be displayed, together with the second images, on the display of the user's client 14 at least once.

The order history recorder 34 records thereon a history of orders a user placed.

Owing to the provision of the order history recorder 34, the second product material selector 28 can select a second product material based on a product order history of a user recorded on the order history recorder 34. For example, the second product material selector 28 can select, for the second product material, a product material the relevant user has never selected or a product material the relevant user has frequently selected.

The product material selection history recorder 36 records thereon a history of selection of the first product material selected by the first product material selector 26, in accordance with an instruction input by each of plural users.

The product material correlation storage 38 stores therein the number of users, who ordered a recommended product together with a user-selected product, for each of product materials stored in the product material storage 18 based on a history of selection of the first product material recorded on the product material selection history recorder 36.

Owing to the provision of the product material selection history recorder 36 and the product material correlation storage 38, the second product material selector 28 can acquire, by reference to a history of selection of the first product material recorded on the product material selection history recorder 36, the number of users who ordered a recommended product together with a user-selected product, which number of users is stored in the product material correlation storage 38, and select, from among a plurality of product materials, a product material that has been selected by many users, that is, users whose number is not lower than a threshold, as the second product material.

Clients 14 are terminal devices owned by users, such as personal computers, tablet computers and smartphones. Each client 14 includes, for example, an input unit such as a keyboard, a mouse or a touch panel, a display such as a liquid crystal display or a touch panel, and a controller that controls processing for causing the input unit to acquire instructions input by a user, processing for causing the display to display various types of information, and other processing.

The server 12 and each client 14 have transmitting and receiving sections therein for transmitting and receiving various types of data between them via the network 16, although not described in this embodiment for avoiding the complexity.

Figure 3:
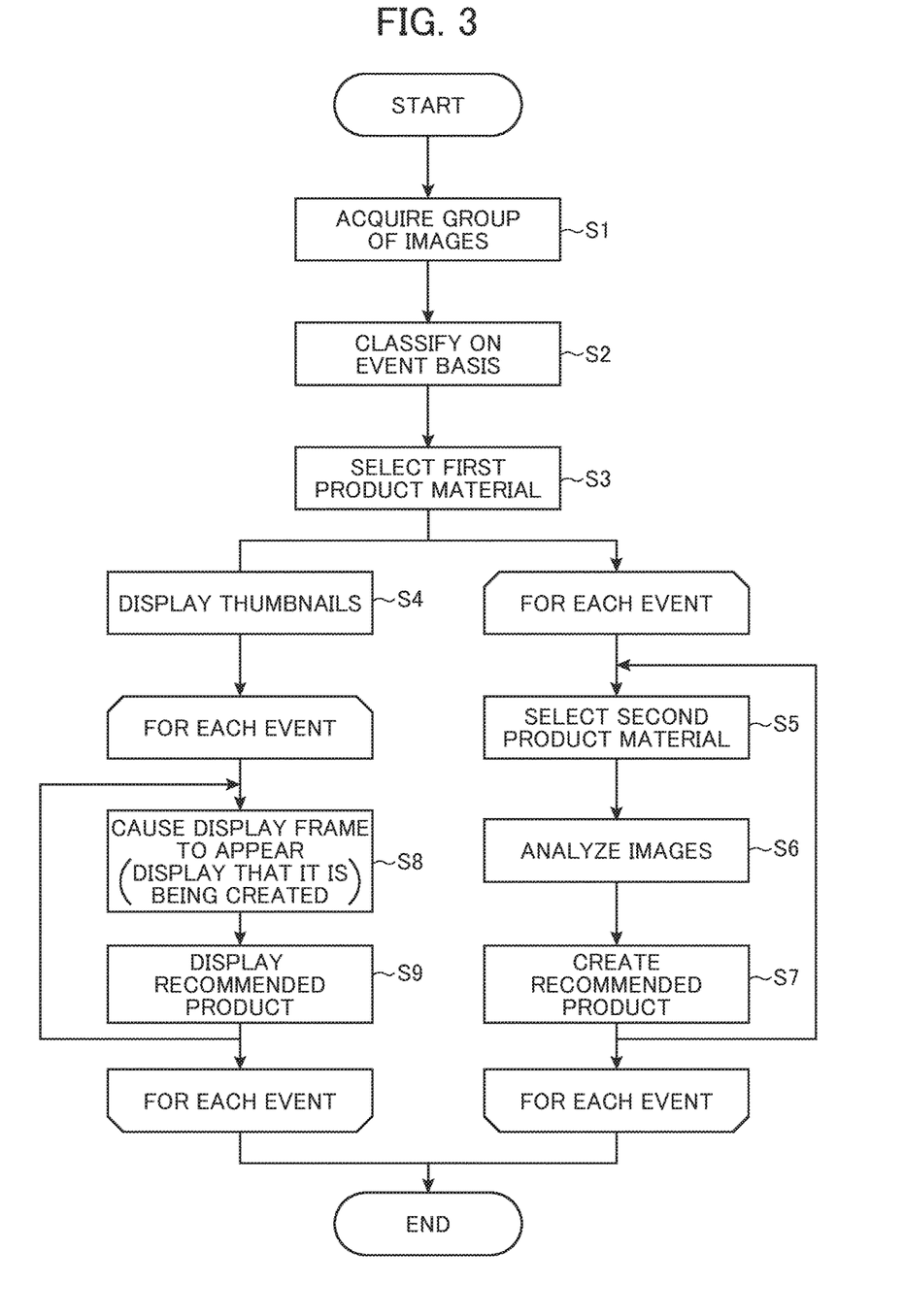
FIG. 3 is a flowchart showing an example of the operation of the image processing apparatus.

Next, the operation of the image processing apparatus 10 is described with reference to the flowchart shown in FIG. 3.

First, when a user inputs, through a user's client 14, an instruction to upload a group of images owned by the user to the server 12, in the server 12, the instruction acquiring section 20 acquires the instruction input by the user.

Subsequently, the group-of-image acquiring section 22 acquires the group of images uploaded from the user's client 14 to the server 12 in accordance with the user's instruction (Step S1).

The group-of-image acquiring section 22 may directly acquire a group of images uploaded from a user's client 14 to the server 12 as in this embodiment or acquire a group of user's images that have been already uploaded to the server 12.

After the group of images are acquired, the image analyzer 24 analyzes each image of the group of images. In the case of this embodiment, event detection processing is carried out to classify the images of the group of images on an event basis (Step S2).

The event detection processing, for instance, uses information on capturing times and capturing locations contained in Exchangeable image file format (Exif) information attached to images and detects events that finish in a single day, such as a Shichi-Go-San ceremony (that is a ceremony for three-, five- or seven-year old children), a wedding, an entrance ceremony, a graduation ceremony and a birthday party, and events that continue over several days, such as a travel. For images having no Exif information, the date of image file update may be utilized, or alternatively, such images may be excluded from images to be subjected to the event detection processing.

Subsequently, the user inputs an instruction from the user's client 14 to select, from among a plurality of product materials stored in the product material storage 18, a product material (first product material) corresponding to a product the user desires to order.

In accordance with this instruction, in the server 12, the first product material selector 26 selects the first product material from among the product materials stored in the product material storage 18 (Step S3). For example, a product material for a normal print is selected as the first product material.

The selection of the first product material may follow the acquisition of a group of images as in this embodiment, and alternatively, they may be carried out inversely.

After the first product material is selected by the first product material selector 26, the user inputs an instruction from the user's client 14 to display the group of images.

Figure 4:
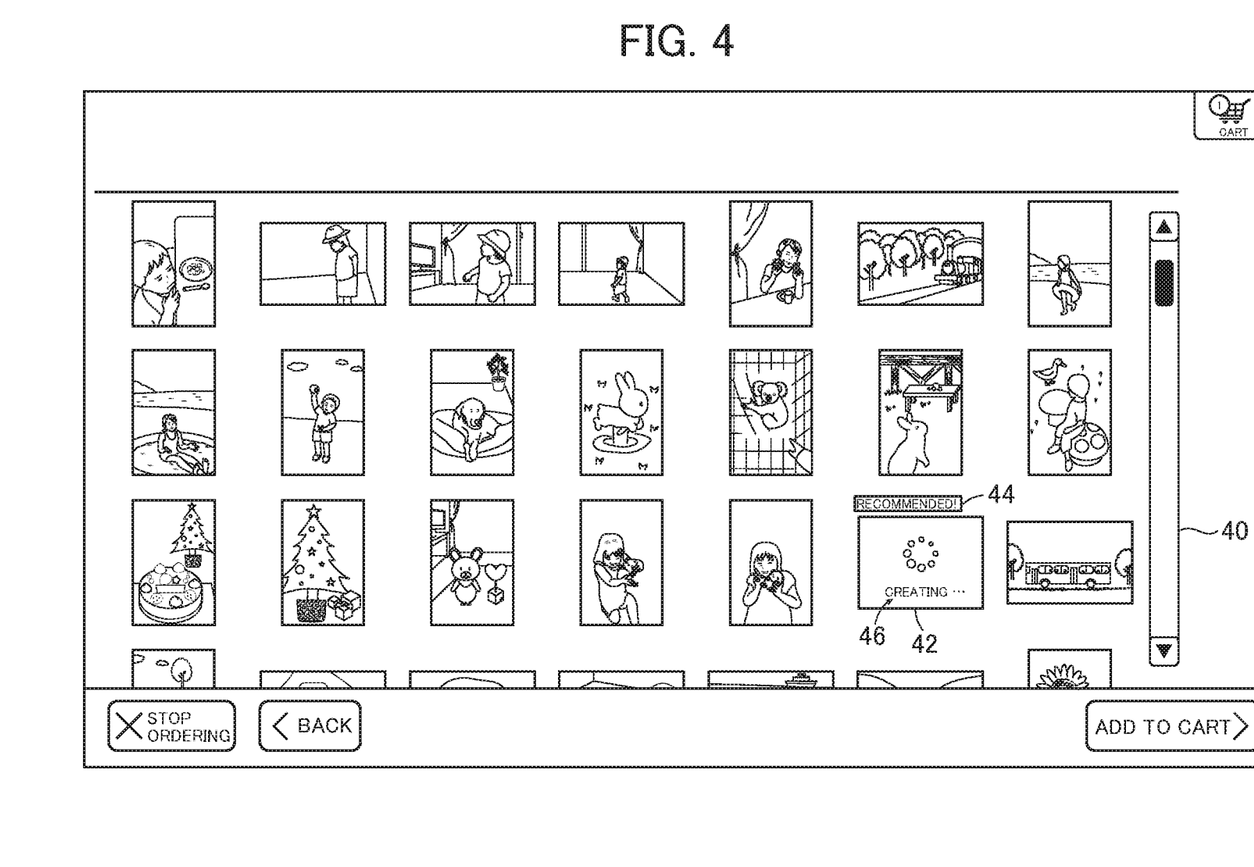
FIG. 4 is a conceptual diagram showing an example in which second images and a display frame of a recommended product are seen on the display of a user's client.

In accordance with this instruction, in the server 12, the display controller 32 causes thumbnails of the images of the group of images to be displayed on the display of the user's client 14, with the images being classified on an event basis, as shown in FIG. 4 (Step S4).

When thumbnails of all the images of the group of images can be displayed within the screen of the display, all the thumbnails are displayed, whereas when thumbnails of all the images cannot be displayed within the screen, thumbnails of partial images (second images) of the group of images are displayed. In the latter case, as shown in FIG. 4, a scroll bar 40 and the like appear, and the user manipulates the scroll bar 40 to scroll the displayed thumbnails of the second images, whereby the thumbnails of all the images of the group of images can be sequentially displayed on the display.

After the first product material is selected, in the server 12, the second product material selector 28 selects, from among the product materials stored in the product material storage 18, a product material (second product material) that is different from the first product material and is suitable for an event detected in the event detection processing (Step S5). For example, a product material for a photo book is selected as the second product material.

After the second product material is selected, the image analyzer 24 makes analyses directed to the second product material on each image of the group of images (Step S6).

Subsequently, the product creator 30 selects, from among the group of images, images (first images) to be applied to the second product material based on results of the image analysis and creates a recommended product by applying the first images to the second product material, that is, in the case of this embodiment, creates a photo book by applying user's images to a product material for a photo book (Step S7).

When not many images are included in the group of images, a recommended product may be created by applying all the images of the group of images to the second product material. When many images are included in the group of images, a part of the group of images is applied to create a recommended product. In the latter case, the product creator 30 selects, from among the group of images, images (first images) to be applied to the second product material based on results of the image analysis.

Meanwhile, it takes time until the process of analyzing images with the image analyzer 24 and the process of creating a recommended product by applying the first images to the second product material with the product creator 30 are completed, and the recommended product cannot be displayed on the display until the creation of the recommended product is completed.

In this case, as shown in FIG. 4, the display controller 32 causes a display frame 42 provided for presenting a recommended product to appear on the display of the user's client 14. In addition, in the case of this embodiment, an icon 42 saying, for instance, "recommended!" appears at the upper left of the display frame 42, while an indication 46 saying, for instance, "creating . . . " for indicating that a recommended product is being created by the product creator 30 appears within the display frame 42 (Step S8).

Indicating the fact that a recommended product is being created can draw user's attention, and this may prompt a user to wait until a recommended product is fully created and then look through the display, or may make a user curious about a recommended product and check the product later.

Figure 5:
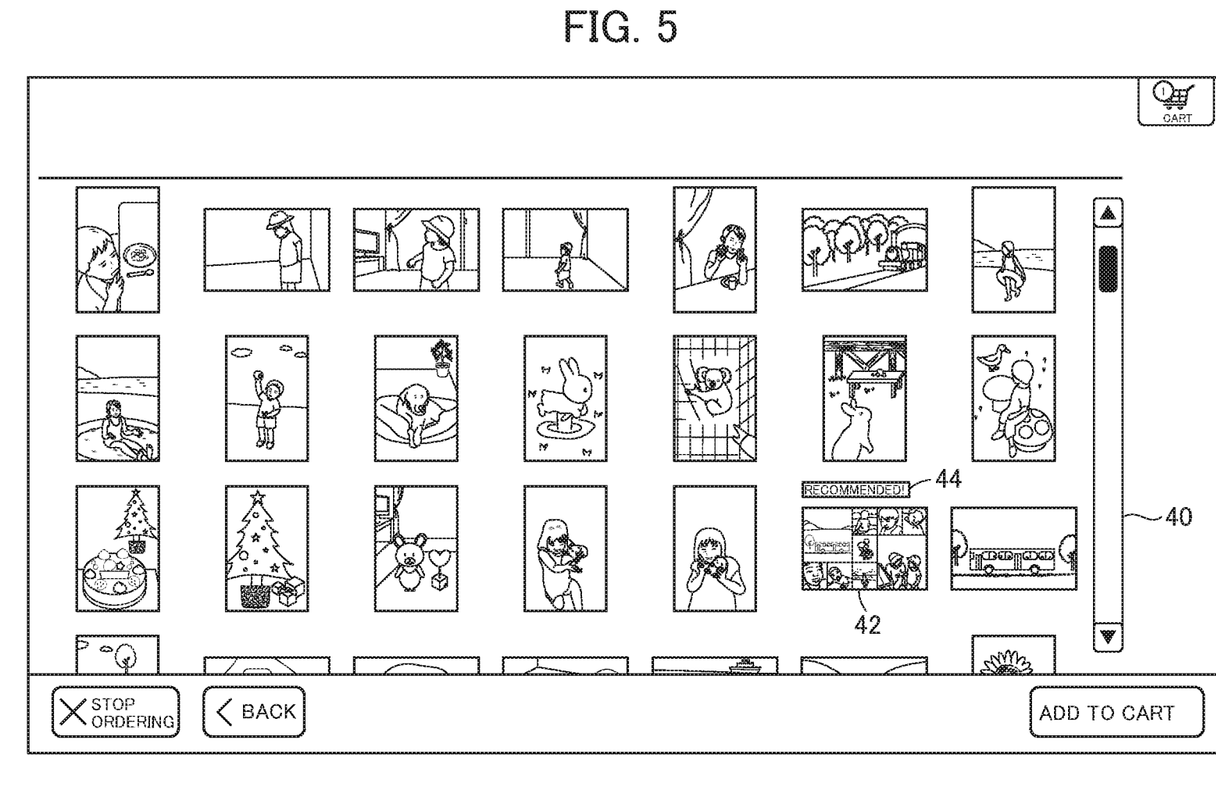
FIG. 5 is a conceptual diagram showing an example in which the second images and a recommended product presented in the display frame are seen on the display of the user's client.

Upon completion of creation of the recommended product, as shown in FIG. 5, the display controller 32 causes the recommended product to be displayed in the display frame 42 on the display (Step S9). In other words, the recommended product, namely the photo book created by applying the user's images, is displayed on the display, together with the second images. In response, the indication 46 indicating the fact that a recommended product is being created disappears.

In displaying a recommended product, the recommended product is preferably emphasized on the display to be more eye-catching than the second images. Exemplary methods of emphasizing include: displaying the icon 44 saying "recommended!"; displaying the icon 44 with high brightness, for instance, higher brightness than the second images; causing the icon 44 to blink; displaying an animation of the icon 44; and displaying the recommended product with a larger size than the second images, for instance, a size four times larger than the second images.

Thereafter, the foregoing operation is repeated for each event. In other words, in the case of this embodiment, recommended products are displayed on the display on an event basis.

Subsequently, when the user selects a user-selected product, puts the same in the user's shopping cart, and inputs an instruction of order with the user's client 14, upon receipt of this instruction, the server 12 processes the order for the user-selected product. Similarly, when the user selects the recommended product, puts the same in the user's shopping cart, and inputs an instruction of order with the user's client 14, upon receipt of this instruction, the server 12 processes the order for the recommended product.

Cases where second images are displayed on the display in accordance with a user's instruction include cases where a user selects an image(s) before ordering a product, such as the case where a user selects a group of images to be uploaded to the server 12, and the case where a user selects, from among second images, a third image(s) to be applied to a first product material. In such cases where second images are displayed on the display in accordance with a user's instruction, the user tends to spend long time selecting an image(s).

A recommended product is displayed on the display together with second images when a user is spending long time selecting an image(s) before ordering a product. This configuration can increase the length of time that the user sees the recommended product together with the second images, and therefore, it is possible to effectively recommend the recommended product to the user, thereby promoting sales of the recommended product.

It should be noted that the product material storage 18 is not limited as long as it can store therein at least names or identification (ID) information of product materials. In addition, the product material storage 18 may store therein types of product materials as well as their names or ID information.

The second product material selector 28 may select, as the second product material, a product material having been manually set in advance for each first product material.

For instance, when a normal print is selected as the first product material, one of a shuffle print and a print with a frame, which have been set in advance, may be selected as the second product material. As above, two or more product materials may be set in advance for the second product material, and one of the set product materials may be selected. When a shuffle print is selected as the first product material, a photo book, which has been set in advance, may be selected as the second product material.

Besides, the second product material selector 28 may automatically select a second product material. In this case, the second product material selector 28 can select a second product material based on results of the image analysis by the image analyzer 24.

For example, the second product material selector 28 can select a second product material based on the number of images included in a group of images, information on capturing times and capturing locations of images, contents of images, and other factors. When, of a group of images, many images show persons, a shuffle print or a photo book can be selected as the second product material. When, of a group of images, there are many images mainly showing non-person objects, such as landscape images, an enlarged print can be selected as the second product material.

When a great event such as a travel is detected as a result of event classification in the event detection processing as in the foregoing embodiment, a shuffle print or a photo book can be selected as the second product material.

When a large number of images are included in a group of images so that recommended products to recommend can be individually displayed on the display over several times, the second product material selector 28 may select, as the second product material, a product material different from a product material used in a recommended product previously displayed on the display, every time a recommended product is displayed on the display. In contrast, the second product material selector 28 may select, as the second product material, the same product material as a product material used in a recommended product previously displayed on the display, every time a recommended product is displayed on the display.

The product creator 30 can create a product as the recommended product, for example, by preferentially applying, of a group of images, an image having a face therein to a second product material based on results of face detection processing, or by preferentially applying, of a group of images, an image having therein a person who is found in many images of the group of images (i.e., images whose number is not lower than a threshold) to a second product material based on results of face recognition processing.

Besides, the product creator 30 can create a recommended product by applying, among a group of similar images, at most one image to a second product material based on results of similar image determination processing. For instance, a shuffle print that does not have an image similar to another image gives better impression.

The product creator 30 can create a recommended product by applying a certain number of images whose evaluation values are high (i.e., not lower than a threshold) to a second product material based on evaluation values of images of a group of images.

When the group-of-image acquiring section 22 acquires, in accordance with a user's instruction, another group of images different from the group of images mentioned in the foregoing embodiment, the image analyzer 24 analyzes images included in those groups of images and calculates evaluation values of images of those groups of images based on results of image analysis made on the images of those groups of images.

In this case, the product creator 30 can create a recommended product by applying, of those groups of images, a certain number of images whose evaluation values are high (i.e., not lower than a threshold) to a second product material based on evaluation values of the images of those groups of images.

When a large number of images are included in a group of images so that recommended products to recommend can be individually displayed on the display over several times, the display controller 32 can cause a recommended product to be displayed on the display for every certain number of images of the group of images.

When the product creator 30 creates a recommended product for each of events detected in the event detection processing, the display controller 32 may display a recommended product on the display on an event basis.

In the above cases, to avoid displaying and recommending products too many times (i.e., avoid annoying a user by such frequent recommendation), recommended products may be displayed on the display at display intervals that are not shorter than the previously-set minimum interval. Such a display interval may be set in such a manner that, for example, a recommended product is displayed once for every 100 images (i.e., every certain number of images) or every capturing date of an event (i.e., every number of events).

However, even when the number of images included in a group of images is small, namely, smaller than the number of images set for the minimum interval, a recommended product is displayed on the display to recommend at least once.

In the image processing apparatus 10, a login ID and a password can be set for each user, and the display controller 32 may cause a recommended product to be displayed on the display once every certain times a user logs in to the image processing apparatus 10, in accordance with a user's instruction.

The display controller 32 may cause a recommended product to be displayed on the display after the group-of-image acquiring section 22 acquires a group of images and the instruction acquiring section 20 acquires an instruction to display second images, or after the group-of-image acquiring section 22 acquires a group of images, namely, after the group of images are uploaded to the server 12, and before the instruction acquiring section 20 acquires an instruction to display second images.

In other words, in the former case, after the instruction acquiring section 20 acquires an instruction to display second images, the second product material selector 28 selects a second product material, the product creator 30 creates a recommended product, and the display controller 32 causes the recommended product to be displayed on the display, together with the second images. Thus, the display controller 32 cannot cause the recommended product to be displayed on the display together with the second images until the instruction acquiring section 20 acquires the instruction to display second images.

In contrast, in the latter case, before the instruction acquiring section 20 acquires an instruction to display second images, the second product material selector 28 selects a second product material, and the product creator 30 creates a recommended product. Thus, the display controller 32 can cause the recommended product to be displayed on the display together with the second images immediately after the instruction acquiring section 20 acquires the instruction to display second images, thereby accelerating the processing.

A recommended product is not limited as long as it is displayed together with second images, and need not necessarily be displayed with a "recommended" icon or emphasized.

The apparatus of the present invention may be composed of constituent elements that are dedicated hardware devices or composed of a computer in which operations of the constituent elements are programmed.

The method of the present invention can be carried out by, for instance, a program that causes a computer to implement steps of the method. A computer readable recording medium having the program recorded thereon may also be provided.

This invention is basically as described above.

While the present invention has been described above in detail, the invention is not limited to the above embodiment, and various improvements and modifications may be made without departing from the spirit and scope of the invention.

What is claimed is:
1. An image processing apparatus comprising:
a product material storage configured to store a plurality of product materials therein;
an instruction acquiring section configured to acquire an instruction input by a user;
a group-of-image acquiring section configured to acquire a group of images in accordance with an instruction of the user;
a first product material selector configured to select a first product material from among the plurality of product materials in accordance with an instruction of the user;
a second product material selector configured to select a second product material that is different from the first product material from among the plurality of product materials;
a product creator configured to create a recommended product by applying a first image constituting at least part of the group of images to the second product material;
a display controller configured to, when second images constituting at least part of the group of images are displayed on a display of a terminal device of the user in accordance with an instruction of the user, cause the recommended product to be displayed, together with the second images, on the display at least once;

a product material selection history recorder configured to record thereon a history of selection of the first product material in accordance with an instruction input by each of a plurality of users; and a product material correlation storage configured to store therein a number of users, who ordered the recommended product together with a user-selected product, for each of the plurality of product materials based on the history of selection of the first product materials, the user-selected product being created by applying a third image constituting at least part of the group of images to the first product material, wherein the second product material selector selects, from among the plurality of product materials, a product material for which the number of users is not lower than a threshold, as the second product material.

2. The image processing apparatus according to claim 1, wherein the second product material selector selects, as the second product material, a product material set in advance for each first product material.

3. The image processing apparatus according to claim 1, further comprising:
an image analyzer configured to analyze images included in the group of images,
wherein the second product material selector selects the second product material based on results of analysis on the images.

4. The image processing apparatus according to claim 3, wherein the second product material selector selects the second product material based on contents of the images.

5. The image processing apparatus according to claim 3, wherein the image analyzer carries out event detection processing for detecting an event for which the images have been captured, and
wherein the second product material selector selects, as the second product material, a product material that is suitable for the event detected in the event detection processing.

6. The image processing apparatus according to claim 1, further comprising:
an order history recorder configured to record thereon a history of product orders the user placed,
wherein the second product material selector selects the second product material based on the history of product orders.

7. The image processing apparatus according to claim 1, further comprising:
an image analyzer configured to analyze images included in the group of images,
wherein the image analyzer carries out face detection processing for detecting a face region in the images included in the group of images, and
wherein the product creator creates the recommended product by preferentially applying, of the group of images, an image having a face therein to the second product material based on results of the face detection processing.

8. The image processing apparatus according to claim 1, further comprising:
an image analyzer configured to analyze images included in the group of images,
wherein the image analyzer carries out face recognition processing for recognizing a face of a person present in the images included in the group of images, and wherein the product creator creates the recommended product by preferentially applying, of the group of images, an image having therein a person who is found in, of the group of images, images whose number is not lower than a threshold to the second product material based on results of the face recognition processing.

9. The image processing apparatus according to claim 1, further comprising:
an image analyzer configured to analyze images included in the group of images,
wherein the image analyzer carries out similar image determination processing for determining similar images included in the group of images to acquire a group of similar images, and
wherein the product creator creates the recommended product by applying, among the group of similar images, at most one image to the second product material based on results of the similar image determination processing.

10. The image processing apparatus according to claim 1, further comprising:
an image analyzer configured to analyze images included in the group of images,
wherein the image analyzer calculates evaluation values of the images included in the group of images based on results of analysis on the images included in the group of images, and
wherein the product creator creates the recommended product by applying, of the group of images, a certain number of images whose evaluation values are not lower than a threshold to the second product material based on the evaluation values.

11. The image processing apparatus according to claim 1, wherein the group-of-image acquiring section acquires another group of images different from the group of images in accordance with an instruction of the user, and the apparatus further comprising:
an image analyzer configured to analyze images included in the group of images and the other group of images,
wherein the image analyzer calculates evaluation values of the images included in the group of images and the other group of images based on results of analysis on the images included in the group of images and the other group of images, and
wherein the product creator creates the recommended product by applying, of the group of images and the other group of images, a certain number of images whose evaluation values are not lower than a threshold to the second product material based on the evaluation values.

12. The image processing apparatus according to claim 1, wherein the display controller causes the recommended product to be displayed on the display for every certain number of images included in the group of images.

13. The image processing apparatus according to claim 1, further comprising:
an image analyzer configured to analyze images included in the group of images,
wherein the image analyzer carries out event detection processing for detecting an event for which the images have been captured,
wherein the product creator creates the recommended product for each event, and
wherein the display controller causes the recommended product to be displayed on the display on an event basis.

14. The image processing apparatus according to claim 13,
wherein the display controller causes the recommended product to be displayed on the display at display intervals that are not shorter than a minimum interval set in advance.

15. The image processing apparatus according to claim 1,
wherein the display controller causes a display frame provided for presenting the recommended product to appear on the display while the product creator is creating the recommended product.

16. The image processing apparatus according to claim 15,
wherein the display controller, in addition, indicates on the display that the product creator is creating the recommended product.

17. The image processing apparatus according to claim 1,
wherein the display controller causes a product created by the product creator to be displayed in such a manner that the product is more eye-catching than the second images.

18. An image processing method comprising:
a step of acquiring an instruction input by a user, with an instruction acquiring section;
a step of acquiring a group of images in accordance with an instruction of the user, with a group-of-image acquiring section;
a step of selecting a first product material from among a plurality of product materials in accordance with an instruction of the user, with a first product material selector;
a step of selecting a second product material that is different from the first product material from among the plurality of product materials, with a second product material selector;
a step of creating a recommended product by applying a first image constituting at least part of the group of images to the second product material, with a product creator;
a step of, when second images constituting at least part of the group of images are displayed on a display of a terminal device of the user in accordance with an instruction of the user, causing the recommended product to be displayed, together with the second images, on the display at least once, with a display controller;
a step of recording a history of selection of the first product material in accordance with an instruction input by each of a plurality of users; and
a step of storing a number of users, who ordered the recommended product together with a user-selected product, for each of the plurality of product materials based on the history of selection of the first product materials, the user-selected product being created by applying a third image constituting at least part of the group of images to the first product material,
wherein, from among the plurality of product materials, a product material for which the number of users is not lower than a threshold is selected, as the second product material.

19. A non-transitory computer readable recording medium having recorded thereon a program which executes and causes a computer to perform each step of the image processing method according to claim 18.

* * * * *